United States Patent [19]
Hunt

[11] 3,861,227
[45] Jan. 21, 1975

[54] VARIABLE RATIO DRIVE MECHANISM FOR BICYCLES

[75] Inventor: Guilbert M. Hunt, Brecksville, Ohio

[73] Assignee: Tokheim Corporation, Fort Wayne, Ind.

[22] Filed: Oct. 11, 1972

[21] Appl. No.: 296,649

Related U.S. Application Data

[63] Continuation-in-part of Ser. No. 158,506, June 30, 1971, abandoned.

[52] U.S. Cl. ............................................. 74/217 B
[51] Int. Cl. ............................................. F16h 9/00
[58] Field of Search. 74/217 B, 242.15 B, 242.11 B, 74/243, 217 C, 217 S; 280/261

[56] References Cited
UNITED STATES PATENTS

| | | | |
|---|---|---|---|
| 2,491,121 | 12/1949 | Lozinski | 74/217 B |
| 2,693,116 | 11/1954 | Juy | 74/217 B |

FOREIGN PATENTS OR APPLICATIONS

| | | | |
|---|---|---|---|
| 898,255 | 11/1953 | Germany | 74/217 B |

*Primary Examiner*—Samuel Scott
*Assistant Examiner*—Frank H. McKenzie, Jr.

[57] ABSTRACT

The invention relates to a mechanism for varying the drive ratio between the crank and the rear wheel of a bicycle. A single drive chain connects the pedal sprocket to drive any one of a number of rear wheel sprockets which are selectively formed by ejecting toothed drive segments from retracted positions to active positions in which they are engageable by the chain.

The drive segments are disposed in circular rows having different diameters concentric with the wheel axle. Each segment is mounted on one end of a nonrotatable pin mounted in the disc to reciprocate parallel to the axle. A pair of shift levers are pivotally mounted at one end and have a long and a short arm extending across the opposite faces of the disc. A first cam is fixed adjacent to the end of the long arm so that it can sweep the free ends of the pins from the inner to the outer row as the lever moves through its limited range, while the shorter arm has a second cam disposed along its length which can move the drive segments from the next to the inner row to a position outside the outer row. When the first cam is positioned in the path of a particular row of pins, the rotation of the disc in the forward direction causes the drive segments of that row to be ejected to form the corresponding sprocket while the second cam causes the segments of all of the larger diametered sprockets to be or remain retracted. Each ejected drive segment engages the chain shortly after its ejection so that the ratio change is completed during one revolution of the disc. A one way clutch connects the disc to drive the wheel hub and also permits the hub to coast relative to the disc.

A yieldable slack storing device is installed on the slack side to compensate for the changing sprocket diameters. A manually settable ratio selecting mechanism is mounted convenient to the rider and is connected with the shift lever to pivot them as described. The selector is provided with means for indicating the settings for the various ratios.

19 Claims, 8 Drawing Figures

PATENTED JAN 21 1975　　　3,861,227

PATENTED JAN 21 1975    3,861,227

VARIABLE RATIO DRIVE MECHANISM FOR BICYCLES

CROSS REFERENCE TO RELATED APPLICATIONS

This application is a continuation-in-part of Applicant's Ser. No. 158,506 filed June 30, 1971, for Variable Ratio Drive Mechanism for Bicycles now abandoned.

BACKGROUND & SUMMARY OF INVENTION

The prior art discloses numerous mechanisms for altering the pedal to wheel ratio of bicycles. In some cases, multiple sprockets and clutches are mounted in the region of the crank and a corresponding number of chains and rear wheel sprockets are required to drive the wheel. Other mechanisms comprise various other change speed devices located at the pedal hub which transmit the selected drive to the wheel by a single chain or shaft. In still other cases, similar mechanisms are located at or in the wheel hub. In other cases a few, integral sprockets are connected with the wheel hub and means are provided for shifting the chain axially from one sprocket to another. In all cases, the above mentioned structures are relatively complex, large in size, materially more expensive to manufacture and less reliable in operation than the single ratio drives usually used. These disadvantages are usually magnified as the number of ratios provided is increased.

It is the purpose of this invention to provide a transmission system which is capable of providing a relatively large number of ratios, but which is comparatively simple.

It is another object of the invention to provide a system which can be applied to existing bicycle frames without alteration thereof except by a few factory applied additional parts, and the provision of a special rear wheel hub.

A further object of the invention is to provide a mechanism which comprises a disc which has a plurality of sprocket tooth drive segments which are mounted so as to reciprocate between retracted and ejected or active positions and which are arranged in concentric, circular rows so that when the segments of a row are ejected, the teeth thereof define a sprocket which lies in the same plane as the runs of the chain so as to be engaged and driven thereby.

Another object of the invention is to provide ratio shifting means which are movable relative to the faces of the disc so as to position a drive segment ejecting cam in the path of a selected circular row and to position a retracting cam in the path of the drive segments in rows of greater diameter than the selected one.

A further object is to provide ratio selecting means which is in an area convenient to the operator for actuating the ratio shifting means.

It is another object of the invention to provide yieldable means disposed on the slack side of the chain to compensate for the alteration in the circumference which results from the transfer of the chain to a different sprocket.

A further object is to provide a mechanism which is comparatively low in cost.

Yet another object is to provide a reliable, long-lived mechanism.

These and other objects will become apparent from a study of this specification and the drawings which are attached hereto, which form a part hereof and in which.

SPECIFICATION

Figure 1:
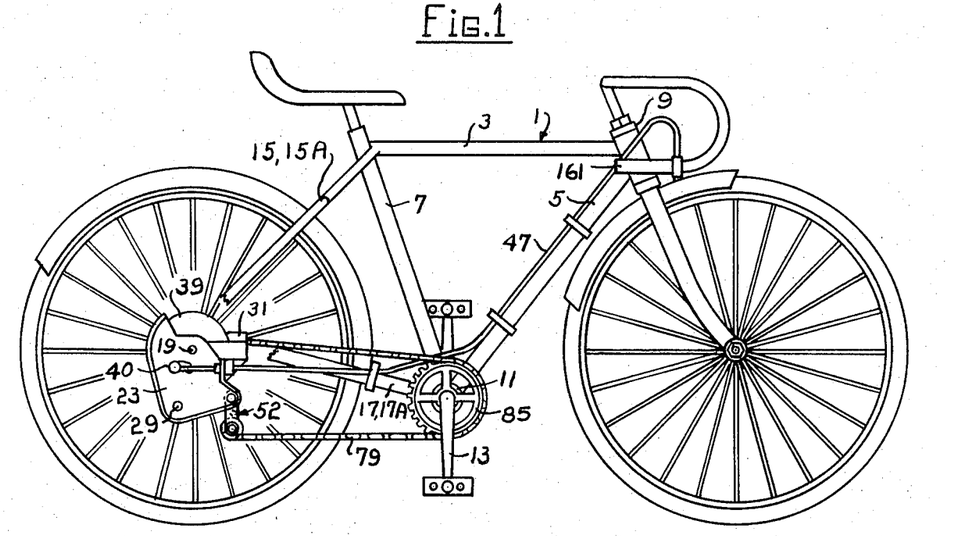
FIG. 1 is an elevation of a bicycle containing the improved structure and showing generally, the frame, pedal sprocket, the multiple sprocket mechanism, ratio selecting and changing mechanism, and chain slack control.

Referring to FIG. 1, numeral 1 indicates generally the bicycle's main frame which comprises upper, front and rear tubular members 3, 5 and 7. The forward ends of 3 and 5 are fixed to the bearing housing 9 for the front fork (not shown). The rear end of 3 is fixed to member 7 adjacent to, but spaced downwardly from the upper end of 7 which projects upwardly beyond 3 to receive a saddle post (also not shown). The lower ends of 5 and 7 converge toward and are fixed to the hub 11 in which the pedal crank 13 is rotatably mounted.

Upper and lower rear forks which comprise parallel, spaced arms 15, 15A and 17, 17A respectively, extend rearwardly from the 3-7 and 5-7 apices of the frame, respectively and converge toward the rear axle 19. The arms 15A and 17A terminate in and are usually integral with an axle support plate 21A (FIG. 4), which has a slot 25A for receiving the axle 19 of the rear wheel. The above structure is commonly employed by prior art devices, which also have a similar axle support for the fork arms 15 and 17.

In the novel structure, however, interposer carrier plate 23 is attached around axle 19 and serves to carry and define the interposer assembly (described later). Detent 2, part of the interposer carrier plate 23, is engaged in slot 25 to serve as a further means to keep the interposer carrier plate from rotating about the axle axis as in FIGS. 2 and 4. The location and size of detent 2 is dependent upon the bicycle being outfitted with the transmission.

Figure 2:
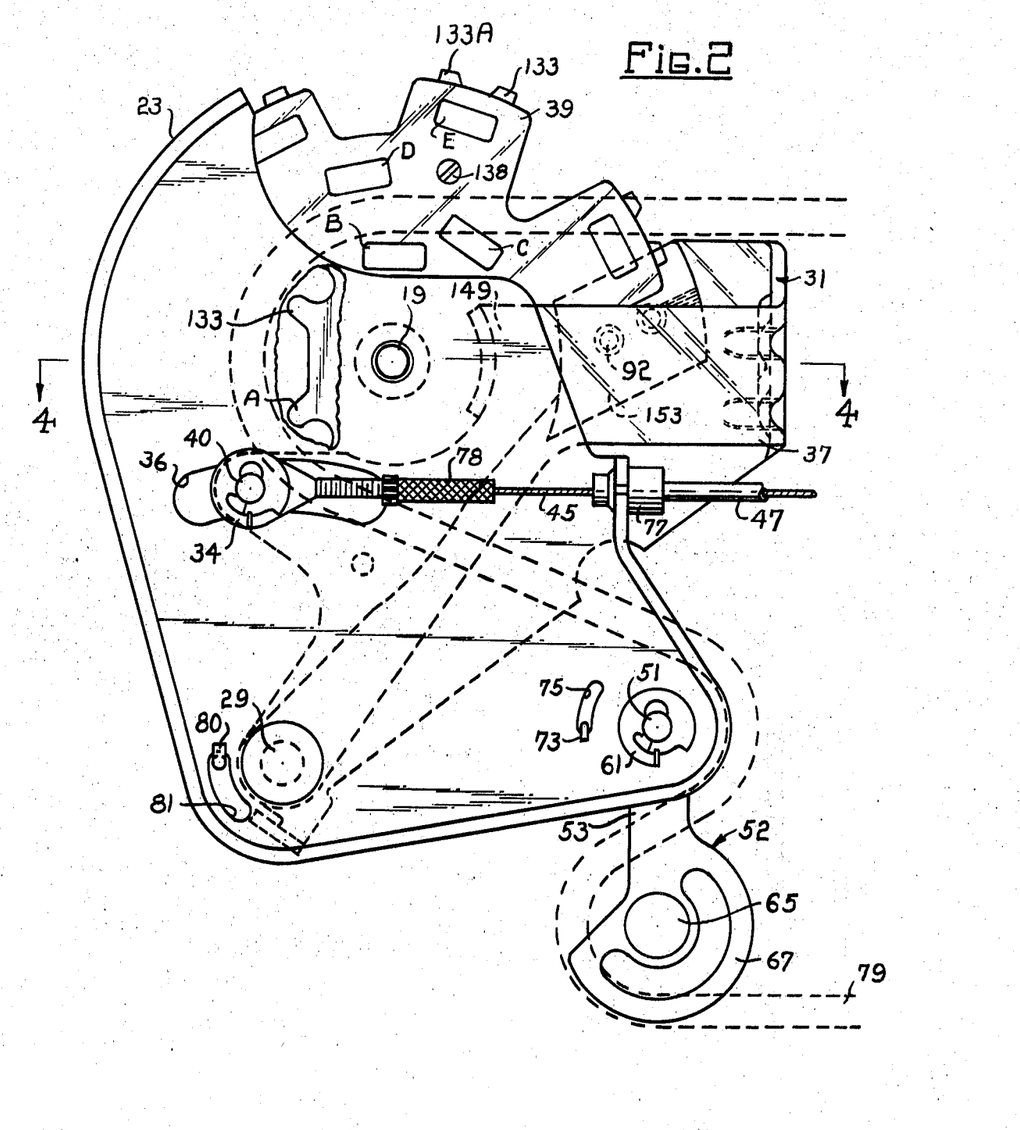
FIG. 2 is an enlarged elevation of the disc, slack control and ratio changing mechanisms.

A pivot stud 29 is fixed in the interposer carrier plate 23 so as to extend perpendicularly therefrom away from the viewer in FIG. 2. The ratio changing assembly 31, being U-shaped arms or levers 35 and 37, is mounted so as both ends will pivot on the stud 29. The two levers 35 and 37 which extend rearwardly toward the axle, are substantially perpendicular from the axle, with the interconnecting bight parallel to the axis. These arms are spaced in a direction parallel with the axle and stud so as to span a disc 39, which is concentric with the axle. Each arm carries a cam which will be described below. Ratio changing assembly 31 has stud 40 which extends parallel to the axle and through slot 36 of interposer carrier plate 23 in the opposite direction from that of 29, but in substantially a different plane so as to pivot it about stud 29. The free end of the core wire 45 of a Bowden Cable is attached to the ear of 40 and is held by spring dip 34 so as to operate the ratio changing assembly 31. The cable sheath 47 is attached to the interposer carrier plate 23 by nut 77 and the core wire adjustment is made by 78. It will be seen that the cable is attached so that as the wire is drawn into or pushed out of the sheath 47, the ratio changing assembly 31 will rock clockwise or counterclockwise, respectively, about the stud 29.

A helical torsion spring 48 is supported on stud 29 so that end 80 bearing in a hole 81 in the interposer carrier plate 23 and its other end 82 bearing in hole 83 (not shown) of arm 37 so as to urge the ratio changing assembly 31 in a counterclockwise direction (FIG. 2) about stud 29. Additionally, nut 84 shown in FIG. 4, engages the end of stud 29 and thereby rotatably mounts both arms 35 and 37 of the assembly 31, about the stud.

Figure 3:
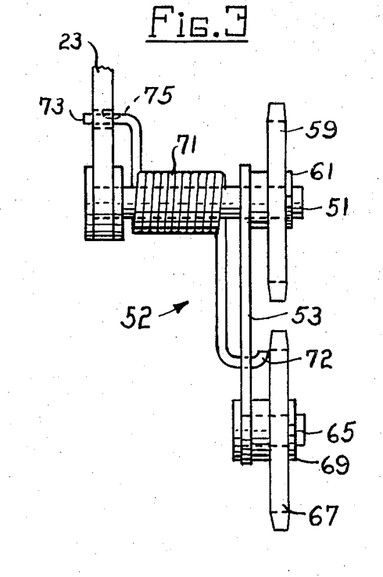
FIG. 3 is an elevation of the slack control mechanism viewed from the right of FIG. 2.

As seen in FIGS. 2 and 3, interposer carrier plate 23, which a stud 51 passes through so as to extend parallel with and in the same direction as stud 29. A chain tensioning and storing mechanism, indicated generally by numeral 52, comprises a bifurcated lever 53, which is perforated to receive the stud 51 so that the lever will pivot thereon. A sprocket 59 is also rotatably mounted on the stud 51 and is held in place by a snapring 61. The free end of lever 53 has a stud 65 fixed therein which extends parallel with and in the direction as stud 51. A sprocket 67 is rotatably mounted on the stud 65 by a snapring 69. A helical torsion spring 71 is supported on stud 51 and has one end 73 bearing in a hole 75 in interposer carrier plate 23 and its other end 72 bearing on lever 53 so as to urge the lever in a clockwise direction (FIG. 2) about stud 51. Since the sprockets are aligned with each other, the flexible drive means, such as chain 79, and with sprockets which are formed on disc 39, as disclosed below, this mechanism will both remove excess slack in the run of the chain which extends from the lower side of the pedal sprocket 85 to sprocket 67 and will also guide this portion of the chain to the disc sprockets. Note that FIG. 2 is partially cut away to expose all five effective diameters (A through E).

Figure 4:
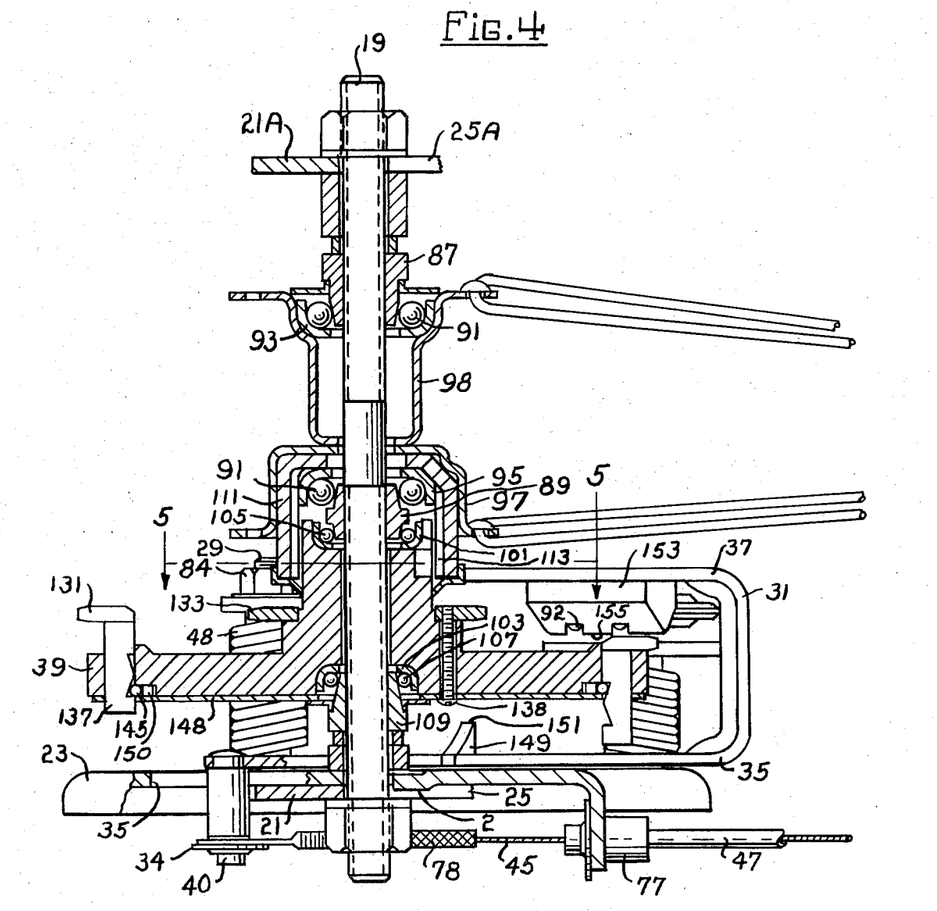
FIG. 4 is a section taken substantially on line 4—4 of FIG. 2, showing the disc and wheel hub, axle, bearings, one way drive ratchet drive to the wheel hub, and drive segments shifting arms and cams.
Figure 5:
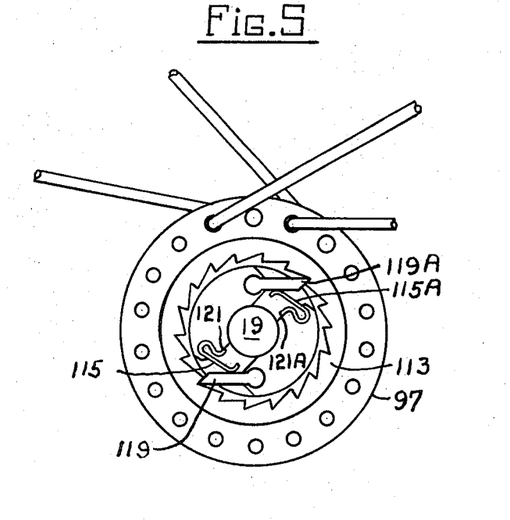
FIG. 5 is a section taken substantially on line 5—5 of FIG. 4.

As seen in FIGS. 4 and 5, axle 19 is removably mounted in the slots 25, 25A by means of washers and nuts which engage the threaded ends of the axle. Ball races 87, 89 are supported on the axle and support the balls 91 in rolling engagement with the wheel hub races 93, 95.

The disc 39 is relatively thick along the shaft axis with an inner end extending beyond the disc toward the wheel hub 97 and race 89 which also serves to hold the ball bearings 105 in contact with the race 101. The other end of the disc also holds race 103 for the balls 107 which are held in place by a third axle mounted race 109. The disc is thus rotatably mounted on the axle for rotation relative to it. The disc will be driven in a clockwise direction (FIGS. 2 and 5) by the chain, as will be explained, and will drive the wheel hub 97 and 98 by means of the pawls 119 and 119A, spring-loaded outward by 115 and 115A, which are driven by disc 39 and which in turn drive ratchet 113 fixed to the wheel hub 97.

As seen in FIG. 4, the wheel hub race 95 is attached to an axial flange 111 which has a greater internal diameter than the protruding end of disc 39. An annular internal ratchet 113 is fixed within flange 111 so as to overlap disc 39. This disc 39 has a peripheral slot 121 which is radially aligned with the ratchet 113 and has diametrically opposed slot 121A. Running radially inwardly from the bottom of the groove to receive the ends of arcuate spring 115 and 115A and pawls 119 and 119A which lie in the groove with their free ends in driving engagement with the teeth of the ratchet. The pawls 119 and 119A in their free state are sprung radially outward and have to be flexed to install them. The driving ends of the pawls are thus held in constant engagement with the ratchet 113 and will drive the hub as the disc rotates clockwise (FIG. 5). They will also ride upon the ratchet whenever the disc stops while the wheel continues to rotate, to allow the bicycle to coast. Slot 121 and 121A holds the pawls in proper alignment with the ratchet.

In order to provide a number of pedal crank to wheel hub ratios, the disc 39 is provided with a plurality of drive toothed sprocket segments 131 which are integral with pins 137. The pins are slidable mounted in the disc for reciprocation so as to move the drive segments between retracted and projected positions in circular rows, so that when projected in various patterns, the segments will form sprockets of different diameters.

Figure 7:
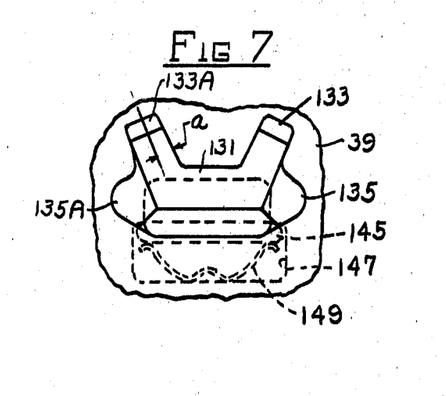
FIG. 7 is an enlarged elevation of a sprocket drive segment.
Figure 8:
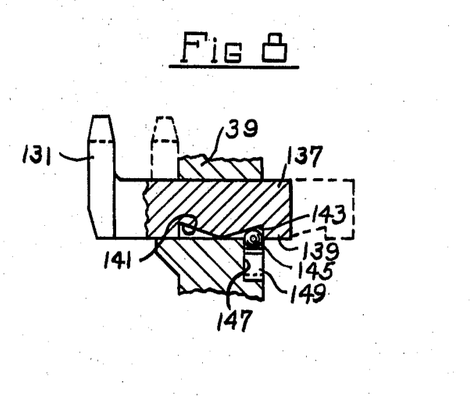
FIG. 8 is an elevation, partly in section of the structure of FIG. 7 viewed from the right thereof and showing the detent mechanism.

As seen in FIGS. 7 and 8, each drive segment 131 has two teeth 133 and 133A which are spaced and shaped so as to operatively engage adjacent rollers of the chain 79, and in this connection it should be noted that it has been found by actual operation that the angle A, of the teeth, FIG. 7, must be smaller than that of the teeth of the sprockets usually employed in present practice to prevent the chain from climbing the teeth. The tips of the teeth are rounded spheroidally, as are the leading and trailing shoulder portions 135 and 135A of the segment, to reduce or eliminate wearing of the cam 153 (FIG. 4) which retracts the segments.

The upper flat surface of each pin is provided with two, axially spaced detent sockets 141 and 143 which are located so as to alternately receive pin 145 as the segment is retracted (dashed line position) or is projected (full line position) in FIG. 8. The pin 145 is adapted to fit freely in the slot 147 in the disc, and plate 148 shown in FIG. 4 is securely attached to the disc 39 by screws 138 to retain pin 145 and spring 149.

Figure 6:
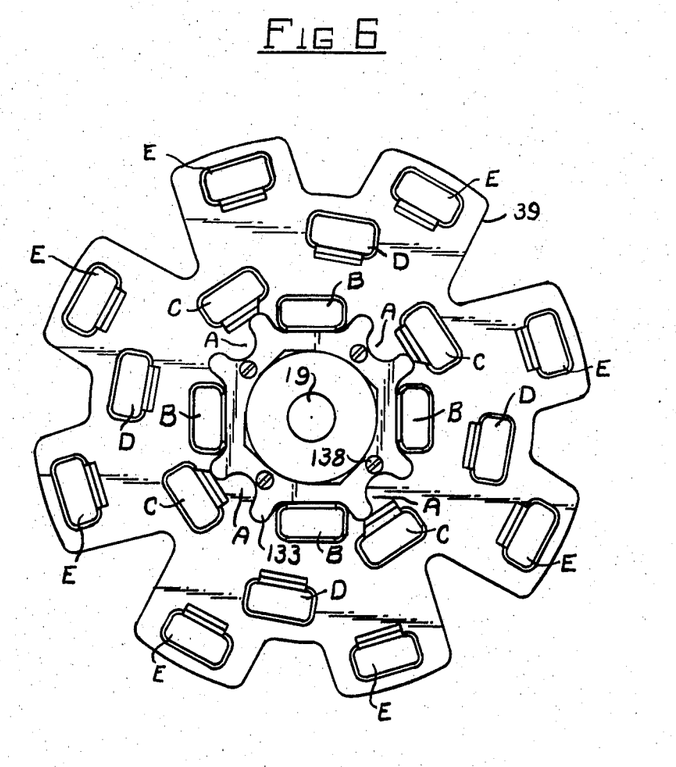
FIG. 6 is an elevation of the sprocket disc showing the locations and arrangement of the pin holes and stationary and drive segments.

Referring to FIG. 6 which shows the face 39 of the disc, it will be seen that there are four teeth A located equidistantly from the axis of axle 19 and equally spaced angularly from each other (90°). The teeth 133 of the four drive segments are mounted to disc 39 by screws 137 to form the highest ratio sprocket.

The holes B for the next lower ratio sprocket have their central axis disposed a greater distance from the axis of 19 than the teeth in row A and are also spaced circumferentially 90° apart, but 45° away from the radial center lines running through the A row.

The number C holes are also four in number and are located 55° away from the radial center lines running through the B holes, but on a circumference which is greater than that of the number B holes, so as to yield an even smaller ratio.

The number D holes, also four in number, are located 10° radial center lines from the B holes, but at a greater distance from center than the C holes, to produce a smaller ratio than the C sprocket. It is obvious that, although the angular distance (90°) between the pin centers of the various sprockets mentioned above has remained constant, the circumferential spacing thereof has been increasing with the diameter of the respective sprockets, as has the length of unsupported chain between the adjacent segments. To provide additional support for the chain when it is engaged with the largest sprocket E, eight holes (45° apart) numbered E are provided instead of the five found in D. The difference between the diameters of the B-A, C-B and D-C sprockets is approximately whereas that of E-D sprockets is greater, so that the angular spacing of the pin centers will change. Accordingly, two pins are disposed one on each side of the radius through the axis of each number D pin and spaced approximately 18° therefrom. The number E sprocket formed by the segments of these pins provides the lowest ratio available in the device shown. It is obvious, however, that more or fewer ratios may be provided, within limits, and that different ratios than those shown may be provided, without departing from the principles disclosed above.

Referring now to FIGS. 2 and 4, the pin actuating arm 35 has a cam 149 fixed to its inner side, adjacent the free end thereof. The cam is a bar of material which has a triangular cross-section and ridge 151 of the bar extends toward the axle while the sloping sides thereof are disposed transversely in the path of the rounded ends of the pins of the particular row of segments which are to be projected to their effective positions to form a particular sprocket.

The crest 151 of the cam is so spaced from the adjacent face of the disc that as each pin of the selected row passes the cam, it will be moved to the right far enough to enable the pin 145 to enter socket 143 (FIG. 8). The segment will thus be positioned in the same plane as the chain just prior to the time at which it will engage the chain to be driven thereby.

The face of the arm 37 which is adjacent the opposite face of the disc 39 from 35, is provided with a wedge-shaped cam 153 which extends substantially the full length of the arm and attached by screws 92. The thin portion 155 of the cam is disposed adjacent the top edge of the arm while the thick portion is at the bottom. The maximum thickness of the cam is such that any segment 131 which enters the gap between the cam and the disc from the top thereof (FIG. 4) will be pushed to the left far enough to allow pin 145 to enter the socket 141 (FIG. 8) which will tend to complete the retraction of the segment. When the ratio changing arm assembly 31 occupies its third gear position, (FIG. 2) cam 153 is disposed in retracting position across the path of the segments which form the outer two sprockets, i.e., across the circular rows containing the E and D pins, while cam 149 extends into the path of the pins in row 6. It is thus made certain that the segments of the C, B and A pins will occupy their active, projected positions while all of the others will occupy their retracted positions. Since the A row is never retracted, a unitary sprocket may be used for the A sprocket instead of the segmental sprocket, if this is desired.

When the shift lever occupies its position E, cam 149 is positioned so as to project the pins of the number E row while cam 153 rides idly out of reach of the number E segments and all of the other segments will be in their projected positions after one full revolution of the disc as all drive segments have been positioned.

As mentioned previously, ratio changing arm assembly 13 is actuated by the Bowden Cable. The other end of the cable sheath 47 is anchored to any conventional remote ratio selecting means such as a selector 161 which has five positions with detents at each position. A pistol grip type incorporated into a handle bar has been found to be the most effective means to operate the Bowden Cable.

OPERATION

Assuming that the bicycle has been operated in the fifth gear position, the actuating means comprising the ratio changing assembly 31 will occupy its counter-clockwise most position as viewed in FIG. 2. The toothed segments of the A or innermost row will be the only ones which are established in the projected or active positions so as to define the small diametered sprocket. All of the other segments have been and remain retracted by cam 153. The rear wheel will, therefore, be driven more revolutions for each revolution of sprocket 85, and this is the maximum ratio available.

Assuming that, while the bicycle is in operation, the shift selector 161 part of the remote ratio selecting means is shifted to its numeral B position. Such action moves the ratio changing assembly 31 clockwise about stud 29 to position the cam 149 for engagement with the number B pins so that the segments thereof will be projected to their active positions so as to form the second larger sprocket. As each drive segment is projected, it is rotated into engagement with the slack side of the chain and the tensioning lever rotates counter-clockwise about stud 51 to yield sufficient chain to accommodate the increased sprocket circumference. It is important to note that the open space between the chain stretches is provided in the clockwise rotating sprocket between the point the drive segments are projected and the chain engagement point, making engagement possible with a slack chain rather than one in tension. Cam 149 performs no function at this time unless a number C, D or A pin has somehow moved out of its retracted position, in which case it moves them back to the retracted position.

The same functions occur in the same order when the shift selector is positioned to establish the C, D and E sprockets. The E sprocket, of course, provides the smallest ratio of pedal to wheel drive. Also, when the E sprocket is fully established, all of the segments occupy their projected positions, provided that the wheel has rotated at least one revolution between successive shifts.

If the shift selector positioned in the B, C, D or E position, step by step, the cam 149 will perform no function unless a segment, in the path of which the cam is positioned, has moved toward its retracted position or was not projected during a prior shift. At the first step, cam 153 will retract the segments of the number E sprocket so that the following teeth of the number D sprocket will engage the chain. Lever 53 will rotate clockwise to take up any resulting slack. The same process occurs at each additional step until the parts are restored to the initial highest ratio position, in which all of the segments except those of the A sprocket are retracted.

The rotation of shift selector from the low to high ratio position while the vehicle is in motion is substantially continuous and uninterrupted. However, should the free end of either arm 35 or 37 strike a pin or segment in a manner such that the rotation of the ratio changing assembly 31 cannot continue momentarily, the relative-long length of the core wire 45 which extends beyond the lower end of the sheath 47 will flex so that as soon as the obstruction has passed, the lever will continue its motion toward the desired setting. During a reverse motion shift selector, such radial contact between the cam 149 and the flat side of a pin will momentarily interrupt the shifting of the ratio changing assembly 31.

It will also be seen that during a quick shift through several ratios from high to low ratio, all of the pins of the sprockets intermediate the initial one and the one to be used do not have to be actuated. Referring to FIG. 6, it will be seen that, for example, the shift is started by moving the cam 149 from the number A pin located at the upper vertical center line, outwardly; it will sweep the B pin which is immediately to its right, the C pin trailing the B pin, the D pin which trails the C pin etc., so that a complete or full sprocket will be established only in the row at which the cam comes to rest. The chain will thus ascend to the desired level in a spiral. It will descend in a similar manner upon quick shifting in the opposite direction. The lever 53 will take up or yield slack as required by the sprocket pattern established by the cams.

Referring again to interposer carrier plate 23, it will be noted that the motion of the plate is a pivotal motion about the pivot stud 29. Such pivotal motion is desirable, as compared for example to a sliding motion, for several reasons. Primarily, the pivotal motion, not depending upon any other contiguous surface, is less susceptible to failure caused by dirt or other foreign substances, or by interference between the two contiguous surfaces. Here the moving contract surfaces are minimal and can be easily sealed, something not possible in a sliding motion arrangement.

Referring again now to the design of the teeth 133 and 133A, it will be noted that the configuration of the teeth, as shown in FIG. 7, yields several most desirable features. A plurality of drive segments 131, rather than just one, increases the contact with the chain 79, and distributes the load of that chain more evenly throughout than the single tooth. Moreover, a fewer number of drive segments 131 are thus required. It will also be noted that drive segments 131 include a shoulder 135 adjacent the tooth 133. Shoulder 135 constitutes a supporting surface for the chain 79 to prevent the chain from dropping below its intended position upon the segment 131 and thus distributing the load between tooth 131 and segment 133A, as well as more resistance to wear. Thus, the design of the drive segments 131 yields a mechanism which evenly and effectively distributes the load of the chain without ride-up and assures an even and pleasant ride to the rider of the vehicle. The device as disclosed could be mounted at the pedal sprocket, as well as on the driven wheel, as a means of providing the desired drive ratios. It should be apparent that with the device mounted both on the pedal sprocket and on the driven wheel, the slack control mechanism can be done away with when the diameters of sprocket and wheel are varied simultaneously.

While a specific embodiment of the invention has been shown and described herein for purposes of illustration, it is desired that the protection afforded by any patent which may issue upon this application not be limited strictly to the disclosed embodiment; but that it extend to all structures and arrangements which contain the essence of the invention and which fall fairly within the scope of the claims which are appended hereto:

I claim:

1. A variable ratio transmission mechanism for engagement with a flexible drive means including a variable diameter transmission member comprising:
    a. a plurality of drive segments adapted for operative engagement with said flexible drive means, said drive segments being mounted on said variable diameter transmission member for movement between an axially retracted position and an axially projected position to establish a plurality of varying effective diameters;
    b. a drive segment retracting means, mounted for pivotal movement between a first limit position located outwardly of the outermost circular row of said drive segments and a second limit position in the path of the next to the innermost row, so as to be positionable in the path of the projected drive segments of each row except the innermost, to retract said drive segments when said variable diameter transmission member is rotated;
    c. drive segment projection actuating means mounted for pivotal movement between a first limit position in the path of the outermost row of projected drive segments and a second limit position in the path of the innermost row, so as to be positionable in the path of any one of said rows of said drive segments so as to project the corresponding drive segments when said variable diameter transmission member is rotated; and
    d. interconnecting means between said drive segment retracting means and said drive segment projection actuating means for simultaneous movement between their respective first and second limit positions to select the particular effective diameter to be defined by said drive segments, so as to establish the selected drive ratio of said mechanism.

2. The structure defined in claim 1 wherein said actuating means is pivotally interposed into the open space between the chain stretches.

3. The structure defined in claim 1 wherein said drive segment retracting means comprising an elongated cam disposed so as to successively enter and remain in the paths of said circular rows of said toothed segments as said drive segment retracting means is pivotally moved from said first to said second limit position, said cam defining a surface which is inclined relative to the adjacent face of said disc, so that when said disc is driven by said flexible drive means, said drive segments of the rows intersected by said cam will be forced to their retracted position as they move across said cam surface.

4. The structure defined in claim 1 wherein said drive segment projection actuating means comprises a cam having a length along the path of its travel between its limit positions such that it will pivotally move out of the path of one row of said pins before entering that of an adjacent row, said cam defining a surface which is inclined relative to the adjacent surface of said disc so that when said disc is rotated, the ends of said pin of said drive segment disposed in a row which is intersected by said cam, will engage said cam surface, and will be pivotally moved thereby toward said disc a distance sufficient to establish the drive segments thereof in their projected positions as said pins cross said cam.

5. The structure defined in claim 1 wherein said interconnecting means further comprises:
 a. a first lever mounted to said drive segment retracting means,
 b. a second lever mounted to said drive segment projection actuating means with each end of said first and second levers yieldably pivoted about a pivotal axis parallel to said disc axis, said levers being spaced in the direction of said pivotal axis so as to span said disc, said first lever extending in parallel, spaced relation with respect to the toothed segment side of said disc and said second lever extending in parallel, spaced relation with respect to the pin side of said disc,
 c. means for attaching said drive segment retracting cam to said first lever so as to extend along the innerside thereof; and
 d. means for attaching said drive segment projection actuating cam to the innerside of said second lever, so that said cams will move simultaneously to corresponding path intersecting positions as said levers are pivoted.

6. The structure defined in claim 5, which includes means for moving said interconnecting means accurately to the desired position in the path of selected rows.

7. The structure defined in claim 1 wherein said variable diameter transmission member comprising a disc, and said drive segments each comprise a pin, slidably mounted in said disc for reciprocation parallel with said disc axis, said pin having a length greater than the thickness of said disc and having a toothed segment at one end thereof, said pin being movable between its projected position, wherein said toothed segment lies in a plane defined by said flexible drive means, and its retracted position, wherein said toothed segment lies in a plane out of the path of said flexible drive means.

8. The structure defined in claim 7 wherein said drive segments are mounted on said disc in a number of circular rows having different diameters so that said tooth segments of the outermost projected position will engage said flexible drive means.

9. The structure defined in claim 7, which comprises detent means in said disc for co-action with said pin, for yieldably holding said pin against reciprocation, when said pin occupies its projected or retracted position.

10. The structure defined in claim 7 further comprising an output means, said output means comprising a shaft, and clutch means connected to be rotated by said disc for driving said shaft when said disc is driven in its intended direction by said flexible drive means.

11. The structure defined in claim 7 wherein said toothed segments comprises a plurality of teeth for engagement with said flexible drive means and a shoulder adjacent to said teeth for supporting said flexible drive means.

12. The structure defined in claim 11 wherein the edges and corners of said toothed segments which outline the outer surface thereof are rounded.

13. A variable ratio transmission mechanism for engagement with a flexible drive means including a variable diameter transmission member comprising:
 a. a plurality of drive segments adapted for operative engagement with said flexible drive means, said drive segments being mounted on said variable diameter transmission member for movement between an axially retracted position and an axially projected position to establish a plurality of varying effective diameters;
 b. an actuating means movable pivotally into the path of said drive segments and operable to project or retract said drive segments to establish the desired effective diameter; and
 c. a yieldable accumulating means aligned with said drive segments when in said projected positions and disposed in engagement with the run of said flexible drive means so as to accumulate and pay out in accordance with the decreases and increases, respectively, in the circumference of the effective diameter of said variable ratio transmission mechanism, and means including said accumulating means and said actuating means for guiding and maintaining said flexible drive means on said drive segments and for shielding said flexible drive means.

14. The structure defined in claim 13 wherein said yieldable accumulating means comprises:
 a. an arm having its upper end mounted to pivot about a fixed axis which is parallel to said disc axis,
 b. a shaft mounted to the lower end of said arm, parallel to said disc axis,
 c. a first sprocket mounted to rotate about said fixed axis,
 d. a second sprocket rotatably mounted on said shaft, both first and second sprockets being disposed substantially in the plane of said drive segments, said flexible drive means running under said second sprocket, between said second and first sprockets, over said first sprocket and then to said variable ratio transmission mechanism; and
 e. a yieldable means for pivoting said lever in a direction to move said second sprocket away from said variable ratio transmission mechanism so as to maintain said flexible drive means in tension.

15. The structure defined in claim 14 which further includes a bicycle comprising a frame, front and rear wheels mounted rotatably to said frame, a transmission system comprising a forward sprocket assembly rotatably mounted about a pedal crank axis and a rear sprocket assembly for driving said rear wheel, one of said forward sprocket assembly and said rear sprocket assembly having said variable diameter transmission member of said variable ratio transmission mechanism operatively connected thereto, said drive segments operable for engagement with said flexible drive means, said flexible drive means interconnecting said forward sprocket assembly and said rear sprocket assembly, a remote ratio selecting means to pivotably position said actuating means into the path of said drive segments thereby varying the effective diameter of said variable diameter transmission member, means operatively connecting said remote control means to said actuating means.

16. The structure as defined in claim 8 which further includes a bicycle comprising a frame, front and rear wheels mounted rotatably to said frame, a transmission system comprising a forward sprocket assembly rotatably mounted about a pedal crank axis and a rear sprocket assembly for driving said rear wheel, one of said forward sprocket assembly and said rear sprocket assembly having said variable diameter transmission member of said variable ratio transmission mechanism operatively connected thereto, said drive segments operable for engagement with said flexible drive means, said flexible drive means interconnecting said forward sprocket assembly and said rear sprocket assembly, a remote ratio selecting means to pivotably position said actuating means into the path of said drive segments thereby varying the effective diameter of said variable diameter transmission member, means operatively connecting said remote control means to said actuating means, wherein said remote ratio selecting means is mounted on said frame and comprising a selector member mounted for movement from one to another of a plurality of predetermined positions corresponding to an equal number of predetermined effective diameters.

17. The structure as defined in claim 16 wherein said variable diameter transmission member is mounted for rotation about an axis on said rear sprocket assembly.

18. The structure as defined in claim 16 wherein said variable diameter transmission member is mounted for rotation about an axis on said forward sprocket assembly.

19. A variable ratio transmission mechanism for engagement with a flexible drive means including a variable diameter transmission member comprising:
 a. a plurality of drive segments adapted for operative engagement with said flexible drive means, said drive means being mounted on said variable diameter transmission member for movement between an axially retracted position and an axially projected position to establish a plurality of varying effective diameters; and
 b. an actuating means mounted for pivotal movement into and out of the path of said drive segments and operable to project or retract said drive segments when said variable diameter transmission member is rotated to establish the desired effective diameter.

* * * * *

UNITED STATES PATENT OFFICE
CERTIFICATE OF CORRECTION

Patent No. 3,861,227      Dated January 21, 1975

Inventor(s) Guilbert M. Hunt

It is certified that error appears in the above-identified patent and that said Letters Patent are hereby corrected as shown below:

Column 4, Line 27, "slidable" should be --slidably--.

Column 6, Line 5, change "13" to --31--.

Column 7, Line 55, change "tooth 131 and segment 133A," to --segment 131 and tooth 133A,--.

Signed and Sealed this eighteenth Day of May 1976

[SEAL]

Attest:

RUTH C. MASON
Attesting Officer

C. MARSHALL DANN
Commissioner of Patents and Trademarks